United States Patent Office 3,468,856
Patented Sept. 23, 1969

3,468,856
METHOD FOR PREPARATION OF POLYVINYL ETHERS
Harumi Asai, Tokyo, and Hisataka Komai and Nobuhide Hada, Yokohama, Japan, assignors to The Japanese Geon Company, Ltd., Tokyo, Japan, a corporation of Japan
No Drawing. Filed Sept. 7, 1966, Ser. No. 577,176
Claims priority, application Japan, Sept. 15, 1965, 40/56,057
Int. Cl. C08f *1/28, 3/38*
U.S. Cl. 260—80.3    6 Claims

ABSTRACT OF THE DISCLOSURE

A process for the preparation of vinyl ether polymers by the polymerization of a vinyl ether in the presence of a catalyst composition comprising (a) an organo aluminum compound of a general formula $$AlX_nR_{3-n}$$

wherein X represents a halogen atom, R is a member selected from a group consisting of alkyl, cycloalkyl, aryl and aralkyl groups, and $n$ is an integer of 0-2; (b) a carboxylic acid anhydride; and (c) a Friedel-Crafts halide, the mol ratio of (a) to (b) being 10–1:1 and the mol ratio of (a) to (c) being 20–1:1.

---

This invention relates to a novel polymerization process of vinyl ether. More particularly, the invention relates to a process for the preparation of polyvinyl ether of high degrees of polymerization in the presence of novel polymerization catalyst.

By means of bulk or solution polymerization of vinyl ether at lower temperatures in the presence of a Friedel-Crafts type catalyst, polymers of various types ranging from viscous liquid to balsam- or soft resin-like substance are obtained. Normally for obtaining high polymer of vinyl ether, it is required that the polymerization should be carried out at considerably low temperatures below room temperature, such as −30° C. or below, except for the process using as the catalyst metal sulfate-sulfuric acid complex or Grignard reagent and oxygen.

The object of the present invention is to provide a process by which it is possible to produce with ease polyvinyl ether of high degrees of polymerization with surprisingly high yield, at relatively high reaction temperatures such as around 0° C., by the use of an appropriate polymerization catalyst in the polymerization reaction of vinyl ether.

Other objects and advantages of the invention will become apparent from the following description.

After extensive researches, we discovered that the following three substances, viz., organo aluminum compound, organic acid anhydride and Friedel-Crafts halide, mutually react to form a catalyst composition of very high catalytic activity suitable for the above object of the invention.

Among the three components forming the catalyst composition useful for the invention, the first, viz., organo aluminum compound, is expressed by a general formula $AlX_nR_{3-n}$ in which $n$ is an integer ranging 0-2, X is a halogen atom represented by fluorine, chlorine, bromine or iodine, and R is a member selected from alkyl, alkenyl, cycloalkyl, aryl or aralkyl groups. Typical examples thereof include triethylaluminum, triisobutylaluminum, tri-n-amylaluminum, tri-n-hexylaluminum, tri-n-octylaluminum, dimethylaluminum fluoride, dimethylaluminum chloride, diethylaluminum chloride, diisopropylaluminum chloride, ethylaluminum dichloride, ethylaluminum sesquichloride, diethyl-ethylenylaluminum, tricyclohexyl- aluminum, triphenylaluminum, tri-p-tolylaluminum, phenylaluminum dichloride, diphenylaluminum chloride, tribenzylaluminum; alkyl-, alkenyl-, cycloalkyl-, aryl- or aralkyl-aluminum halide mixtures obtained by direct reaction of aluminum metal with alkyl-, alkenyl-, cycloalkyl-, aryl- or aralkyl halide; or alkyl-, alkenyl-, cycloalkyl-, aryl- or aralkyl aluminum halide mixtures obtained by mixing alkyl-, alkenyl-, cycloalkyl-, aryl- or aralkyl-aluminum with aluminum halide. As the second component, viz., organic acid anhydride for example, acetic anhydride, propionic anhydride, butyric anhydride, stearic anhydride, maleic anhydride, succinic anhydride, acrylic anhydride, itaconic anhydride, benzoic anhydride, phthalic anhydride, acetic-propionic anhydride, acetic-butyric anhydride and the like are contemplated. Whereas, as the third component, viz., Friedel-Crafts halide, halides or oxyhalides of aluminum, barium, boron, beryllium, bismouth, calcium, cedmium, cesium, cobalt, chromium, copper, iron, gallium, silver, magnesium, manganese, molybdenum, lead, rhodium, antimony, silicon, tin, titanium, uranium, vanadium, tungsten, zinc, zirconium, etc. are used, among which the particularly preferred being titanium tetrachloride, molybdenum pentachloride, molybdenum oxychloride, vanadium trichloride, vanadium tetrachloride, vanadium oxychloride, manganese chloride, zinc chloride, cobalt chloride, iron chloride, nickel chloride, aluminum chloride, aluminum bromide, tin chloride, titanium tetrabromide, titanium tetraiodide, titanium tetrafluoride, and the like. The quantitative ratios of the above three components forming the catalyst composition of the invention can be varied over a wide range. Normally, however, the organo aluminum compound is 10–1 time the organic acid anhydride in terms of molar ratio, preferably within the range of 5–2 times, and 20–1 time the Friedel-Crafts halide, preferably within the range of 5–1 time.

The order of addition of those three components to form the catalyst system of the invention does not appreciably affect the polymerizability or yield, but normally they are added by the order of organo aluminum compound, organic acid anhydride and Friedel-Crafts halide. And these three components form a still more active catalyst composition when aged subsequently to the addition thereof to the reaction system.

The amount for use of the catalyst composition of the invention again may be optionally varied over a wide range, but normally it is from 0.01 to 20 mol percent to the monomer, the preferred range being 0.05 to 5 mol percent.

Vinyl ether monomers to be subjected to the polymerization in accordance with the present invention include alkylvinyl ether, cycloalkylvinyl ether, aralkylvinyl ether, arylvinyl ether, and the corresponding propenyl ether or isopropenyl ether and alkylbutadienyl ether, etc. As the alkylvinyl ether, for example, methylvinyl ether, ethylvinyl ether, n-propylvinyl ether, isopropylvinyl ether, n-butylvinyl ether, isobutylvinyl ether, neopentylvinyl ether, n-hexylvinyl ether, 2-ethylhexylvinyl ether, stearylvinyl ether, n-dodecylvinyl ether, ni-tetradecylvinyl ether, 2-cyanoethylvinyl ether, chloromethylvinyl ether, 2-chloroethylvinyl ether, trifluoroethylvinyl ether, 2-methoxyethylvinyl ether and the like may be named. Whereas, as cycloalkylvinyl ether, cyclohexylvinyl ether, isobornylvinyl ether, α-terpinylvinyl ether and the like are contemplated. As aralkylvinyl ether, benzylvinyl ether, p-chlorobenzylvinyl ether, α,α-dimethylbenzylvinyl ether, etc., and as the arylvinyl ether, phenylvinyl ether, p-methylphenylvinyl ether, etc. may be named. Furthermore, as the alkylbutadienyl ether, there are 1-methoxy-1,3-butadiene, 1-ethoxy-1,3-butadiene 1-propoxy-1,3-butadiene, 1-butoxy-1,3-butadiene and 2-methoxy-1,3-butadiene, etc. These vinyl ether monomers may be used alone or as mixtures of two or more of the monomers. Also, for example, by copolymerizing an alkylbutadienyl ether as a vinyl ether monomer component, a polymer which is cross-linkable with sulfur can be obtained.

In the polymerization system in which the catalyst of the invention is used, the catalyst and the monomer may be added continuously or intermittently, or the entire amount may be added at one time.

In the polymerization of vinyl ether in the presence of the catalyst in accordance with the invention, the use of solvent is optional. Usable solvents include aliphatic and aromatic hydrocarbons such as hexane, heptane, benzene, and toluene; aliphatic and aromatic halogenated hydrocarbons such as dichloromethane, dichloroethane, and monochlorobenzene.

The temperature of the polymerization system in accordance with the invention normally lies within the range of $-100°$ C.$\sim 200°$ C., preferably $-80°$ C.$\sim 100°$ C. Temperatures in the vicinity of $0°$ C. are particularly advantageous. The pressure ranges from atmospheric to 300 atmospheres.

Now the invention will be explained more specifically with reference to the working examples.

Example 1

A well dried pressure-resistant 100 ml. glass polymerization vessel was filled with dry nitrogen, and into which 50 ml. of toluene thoroughly dried with calcium hydride was added, followed by the addition of 0.0575 g. (0.5 millimol) of triethylaluminum and 0.0204 g. (0.2 millimol) of acetic anhydride. After aging for an hour with shaking at room temperature, the system was further added with 0.0189 g. (0.1 millimol) of titanium tetrachloride, and the aging was continued for additional 2 hours with shaking at room temperature. To the catalyst system then 38.1 g. (0.38 mol) of isobutylvinyl ether dried with metal sodium was added, and the mixture was polymerized at $0°$ C. for 3 hours with shaking. Thereafter the polymerization was terminated by addition of methanol to the reaction mixture. Subsequently the reaction mixture was thrown into a large quantity of methanol to separate the polymer. The product was dissolved in benzene, again precipitated with methanol, and frozen in the form of a benzene solution and dried. A solid polymer having an intrinsic viscosity of 3.5 (measured at $30°$ C. using toluene) was obtained at a yield of 85.3%. (Unless otherwise specified, intrinsic viscosities hereafter appearing were all measured under the same conditions.)

Examples 2–12

Using each different organo aluminum compound as indicated in Table 1 below in place of triethylaluminum of Example 1, each corresponding solid polymer as in Table 1 was obtained.

TABLE 1

| Ex. No. | Organo aluminum compound (millimol) | Organic acid anhydride (millimol) | Titanium tetrachloride (millimol) | Yield (percent) | Intrinsic viscosity |
|---|---|---|---|---|---|
| 2 | Triisobutylaluminum (0.5) | Acetic anhydride (0.2) | 0.1 | 100 | 2.73 |
| 3 | do | do | 0.2 | 98 | 1.75 |
| 4 | do | do | 0.3 | 95 | 0.91 |
| 5 | Tri-n-hexylaluminum (0.5) | do | 0.1 | 92 | 1.81 |
| 6 | do | do | 0.2 | 93 | 0.88 |
| 7 | do | do | 0.3 | 90 | 0.87 |
| 8 | Diethylaluminum chloride (0.3) | do | 0.1 | 85 | 2.0 |
| 9 | do | do | 0.05 | 34 | 5.1 |
| 10 | do | Maleic anhydride (0.1) | 0.05 | 92 | 1.3 |
| 11 | do | Maleic anhydride (0.05) | 0.05 | 98 | 2.3 |
| 12 | Ethylaluminum dichloride (0.3) | Acetic anhydride (0.2) | 0.1 | 96 | 1.0 |

Examples 13–20

Example 1 was repeated except that the organic acid anhydride was varied each time as shown in Table 2, producing solid polymers in all cases as shown also in Table 2.

TABLE 2

| Example No. | Organic acid anhydride Type | Amount (millimol) | Triethylaluminum Amount (millimol) | Titanium tetrachloride Amount (millimol) | Polymerization temp. (° C.) | Polymerization time (hr.) | Yield Percent | Intrinsic viscosity |
|---|---|---|---|---|---|---|---|---|
| 13 | Phthalic anhydride | 0.29 | 0.37 | 0.18 | 5 | 0.4 | 89.5 | 1.1 |
| 14 | Succinic anhydride | 0.20 | 0.73 | 0.37 | 5 | 0.4 | 86.5 | 1.2 |
| 15 | Maleic anhydride | 0.43 | 0.54 | 0.27 | 5 | 2.6 | 43.6 | 2.2 |
| 16 | do | 0.24 | 0.56 | 0.28 | 5 | 0.6 | 91.7 | 1.8 |
| 17 | Acetic anhydride | 0.40 | 0.50 | 0.05 | 5 | 1.5 | 73.3 | 2.3 |
| 18 | do | 0.20 | 0.50 | 0.05 | 5 | 1.5 | 93.4 | 3.4 |
| 19 | do | 0.10 | 0.50 | 0.10 | 5 | 1.5 | ~100 | 3.18 |
| 20 | do | 0.10 | 0.50 | 0.05 | 5 | 1.5 | 94.7 | 4.3 |

Examples 21–27

Example 1 was repeated except that the Friedel-Crafts halide was varied each time as indicated in Table 3, producing solid polymers in all cases as indicated also in Table 3.

TABLE 3

| Example No. | Friedel-Crafts halide Type | Amount (millimol) | Solvent | Yield (percent) | Intrinsic viscosity |
|---|---|---|---|---|---|
| 21 | Iron chloride | 0.2 | Toluene | 90.5 | 6.2 |
| 22 | Molybdenum chloride | 0.2 | do | 60.0 | 5.5 |
| 23 | Titanium tetrabromide | 0.2 | Benzene | ~100 | 1.1 |
| 24 | Aluminum bromide | 0.2 | do | ~100 | 1.1 |
| 25 | Vanadium oxychloride | 0.05 | do | ~100 | 5.7 |
| 26 | do | 0.1 | do | 98.5 | 2.1 |
| 27 | do | 0.2 | do | 98.1 | 1.6 |

Examples 28–34

Example 1 was repeated except that the aging time after the addition of 0.5 millimol of triethylaluminum and 0.4 millimol of acetic anhydride (time A) and that after the addition of 0.2 millimol of titanium tetrachloride (time B) were varied each time and that the polymerization was performed at 5° C. for 2.0 hours, with the results as shown in Table 4.

TABLE 4

| Example No. | Aging time A (min.) | Aging time B (min.) | Yield Percent | Intrinsic viscosity |
| --- | --- | --- | --- | --- |
| 28 | 5 | 10 | 44.5 | 0.7 |
| 29 | 5 | 60 | 77.5 | 0.7 |
| 30 | 5 | 120 | 88.1 | 1.1 |
| 31 | 30 | 10 | 94.1 | 0.8 |
| 32 | 30 | 60 | 83.2 | 0.8 |
| 33 | 60 | 10 | ~100 | 0.8 |
| 34 | 60 | 60 | 96.4 | 1.2 |

Examples 35–37

Example 1 was repeated except that the toluene used as the solvent therein was replaced by various solvents as in Table 5, producing solid polymers as indicated also in Table 5.

TABLE 5

| Example No. | Solvent | Yield (percent) | Intrinsic viscosity |
| --- | --- | --- | --- |
| 35 | Dichloromethane | ~100 | 1.7 |
| 36 | n-Hexane | ~100 | 1.3 |
| 37 | Benzene | 92.3 | 3.0 |

Examples 38–41

Example 1 was repeated except that the polymerization temperature was varied each time as shown in Table 6, producing solid polymers in all cases as shown also in Table 6.

TABLE 6

| Example No. | Polymerization temp. (° C.) | Yield (percent) | Intrinsic viscosity |
| --- | --- | --- | --- |
| 38 | 60 | 87.8 | 0.44 |
| 39 | 20 | 80.5 | 0.71 |
| 40 | −20 | 63.1 | 2.15 |
| 41 | −78 | 28.3 | 3.25 |

Examples 42–48

Example 1 was repeated except that the vinyl ether monomer to be polymerized was varied each time as shown in Table 7, producing solid polymers as indicated also in Table 7.

TABLE 7

| Example No. | Monomer | Yield (percent) | Intrinsic viscosity |
| --- | --- | --- | --- |
| 42 | Ethylvinyl ether | 97.9 | 1.2 |
| 43 | n-Butylvinyl ether | 76.5 | 3.2 |
| 44 | 2-ethylhexylvinyl ether | 95.3 | 1.9 |
| 45 | n-Dodecylvinyl ether | 92.0 | 0.57 |
| 46 | n-Tetradecylvinyl ether | 93.5 | 0.76 |
| 47 | 2-chloroethylvinyl ether | 60.1 | 2.7 |
| 48 | 2-methoxyethylvinyl ether | 88.5 | 2.4 |

Examples 49–51

Example 1 was repeated except that as the vinyl ether monomer, a mixture of isobutylvinyl ether and 2-chloroethylvinyl ether, or a mixture of 2-ethylhexylvinyl ether and 2-chloroethylvinyl ether was used, producing solid polymers as shown in Table 8. The infrared absorption spectra of all the polymers indicated the presence of carbon-chlorine bond. The composition in percentage of each of the polymers shown in Table 8 was calculated from the result of chlorine content of the polymer.

TABLE 8

| Example No. | Monomer I (mol) | Monomer II (mol) | Yield (percent) | Intrinsic viscosity | Polymer composition (percent) Monomer I | Polymer composition (percent) Monomer II |
| --- | --- | --- | --- | --- | --- | --- |
| 49 | Isobutylvinyl ether (0.076) | 2-chloroethylvinyl ether (0.010) | 95.4 | 1.9 | 88.8 | 11.2 |
| 50 | do | 2-chlorethylvinyl ether (0.020) | 90.4 | 1.7 | 82.7 | 17.3 |
| 51 | 2-ethyhexylvinyl ether (0.053) | 2-chloroethylvinyl ether (0.010) | 60.2 | 0.8 | 86.5 | 13.5 |

Examples 52–53

Example 1 was repeated except that as the vinyl ether monomer, a mixture of 0.36 mol of isobutylvinyl ether and 0.02 mol of alkylbutadienyl ether specified in Table 9 was used, producing solid polymers as shown also in Table 9. The infrared absorption spectra of both of the polymers indicated the presence of carbon-carbon double bond.

TABLE 9

| Example No. | Alkylbutadienyl ether | Yield (percent) | Intrinsic viscosity |
| --- | --- | --- | --- |
| 52 | 1-methoxy-1,3-butadiene | 96.5 | 3.1 |
| 53 | 1-butoxy-1,3-butadiene | 94.3 | 2.9 |

We claim:

1. A process for the proportion of a vinyl ether polymer which comprises polymerizing a monomeric system consisting of one or more vinyl ethers at a temperature within the range of −80° to 100° C. in the presence of a catalyst composition comprising (a) an organo aluminum compound of a general formula $$AlX_nR_{3-n}$$

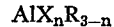

wherein X represents a halogen atom, R is a member selected from a group consisting of alkyl, cycloalkyl, aryl and aralkyl groups, and $n$ is an integer of 0–2; (b) a carboxylic acid anhydride; and (c) a Friedel-Crafts halide, the mol ratio of (a) to (b) being 10–1:1 and the mol ratio of (a) to (c) being 20–1:1.

2. A process for the preparation of a vinyl ether polymer which comprises polymerizing a monomeric system consisting of one or more vinyl ethers at a temperature within the range of −80° to 100° C. in the presence of a catalyst composition formed by the steps of mixing carboxylic acid anhydride with an organo aluminum compound of a general formula $$AlX_nR_{3-n}$$

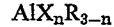

wherein X represents a halogen atom, R is a member selected from a group consisting of alkyl, cycloalkyl, aryl and aralkyl groups, and $n$ is an integer of 0–2, and further mixing the resultant mixture with a Friedel-Crafts halide, the organo aluminum compound and carboxylic acid anhydride being mixed at a mol ratio of 10–1:1 with the Friedel-Crafts halide being mixed in a mol ratio to the organo aluminum compound of 20–1:1.

3. A process for the preparation of a vinyl ether polymer which comprises polymerizing a monomeric system consisting of one or more vinyl ethers at a temperature within the range of −80° to 100 C. in the presence of a catalyst composition formed by the steps comprising mixing a carboxylic acid anhydride with an organo aluminum compound of a general formula $$AlX_nR_{3-n}$$

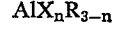

wherein X represents a halogen atom, R is a member selected from a group consisting of alkyl, cycloalkyl, aryl and aralkyl groups, and $n$ is an integer of 0–2, mixture, further mixing therewith a Friedel-Crafts halide and aging the resultant mixture, the organo aluminum compound and carboxylic acid anhydride being mixed at a mol ratio of 10–1:1 with the Friedel-Crafts halide being mixed in a mol ratio to the organo aluminum compound of 20–1:1.

4. A process for the preparation of a vinyl ether polymer which comprises polymerizing a monomeric system consisting of one or more vinyl ethers at a temperature within the range of −80° to 100° C. in the presence of a catalyst composition formed by aging a mixture of (a) an organo aluminum compound of a general formula $$AlX_nR_{3-n}$$

wherein X represents a halogen atom, R is a member selected from a group consisting of alkyl, cycloalkyl, aryl and aralkyl groups, and $n$ is an integer of 0–2; (b) an organic acid anhydride and (c) a Friedel-Crafts halide, the mol ratio of (a) to (b) being 10–1:1 and the mol ratio of (a) to (c) being 20–1:1.

5. The process according to claim 1 in which the polymerization is performed in the presence of a solvent which is capable of maintaining the polymerization system at solution state.

6. A process for the preparation of a vinyl ether polymer which comprises polymerizing a monomeric system consisting of one or more vinyl ethers at a temperature within the range of −80° to 100° C. in the presence of a catalyst composition comprising (a) an organo aluminum compound selected from a group consisting of triethylaluminum diethylaluminum chloride, ethylaluminum dichloride, triisobutylaluminum and trinormalhexylaluminum, (b) a carboxylic acid anhydride selected from a group consisting of acetic anhydride maleic anhydride, succinic anhydride and phthalic anhydride, and (c) a Friedel-Crafts halide selected from a group consisting of titanium tetrachloride, titanium tetrabromide, iron chloride, molybdenum chloride, aluminum bromide and vanadium oxychloride, the mol ratio of (a) to (b) being 10–1:1 and the mol ratio of (a) to (c) being 20–1:1.

References Cited

UNITED STATES PATENTS

| | | |
|---|---|---|
| 2,965,627 | 12/1960 | Field et al. |
| 3,026,290 | 3/1962 | Gluesekamp. |
| 3,065,220 | 11/1962 | McManimie et al. |
| 3,260,698 | 7/1966 | Nakano et al. |
| 2,271,381 | 9/1966 | Andersen et al. |

OTHER REFERENCES

Takakura et al., Chem. ABS., 63 (1965) pp. 7110h.
Solvay, Chem. ABS., 60 (1964) pp. 14629f.

HARRY WONG, Jr., Primary Examiner

U.S. Cl. X.R.

252—429; 260—47, 79.5, 85.5, 88.7, 91.1

UNITED STATES PATENT OFFICE

CERTIFICATE OF CORRECTION

Patent No. 3,468,856                September 23, 1969

Harumi Asai et al.

It is certified that error appears in the above identified patent and that said Letters Patent are hereby corrected as shown below:

Columns 3 and 4, TABLE 1, sixth column, line 10 thereof, "2.3" should read -- 2.1 --; same columns, TABLE 2, seventh column, line 4 thereof, "0.6" should read -- 2.6 --. Column 6, line 30, "proportion" should read -- preparation --.

Signed and sealed this 21st day of April 1970.

(SEAL)
Attest:

Edward M. Fletcher, Jr.            WILLIAM E. SCHUYLER, JR.
Attesting Officer                  Commissioner of Patents